United States Patent [19]

Rosenquist et al.

[11] 4,448,953
[45] May 15, 1984

[54] PREPARATION OF BENZOATE ESTER TERMINATED POLYCARBONATE WITH AROYL HALIDE

[75] Inventors: Niles R. Rosenquist; Victor Mark, both of Evansville; Charles V. Hedges, Mount Vernon, all of Ind.

[73] Assignee: General Electric Company, Mt. Vernon, Ind.

[21] Appl. No.: 409,304

[22] Filed: Aug. 18, 1982

Related U.S. Application Data

[63] Continuation of Ser. No. 221,935, Dec. 31, 1980, abandoned.

[51] Int. Cl.³ .............................................. C08G 63/62
[52] U.S. Cl. ................................... 528/198; 525/462; 528/199
[58] Field of Search .................. 528/198, 199; 525/462

[56] References Cited

U.S. PATENT DOCUMENTS 3,133,045  5/1964  Deanin et al. ....................... 528/196
3,475,373 10/1969  Jackson, Jr. ........................... 260/47
4,334,053  6/1982  Freitag ................................. 528/179

Primary Examiner—Harold D. Anderson
Attorney, Agent, or Firm—Martin B. Barancik

[57] ABSTRACT

A process for preparing an aromatic polycarbonate of controlled molecular weight which comprises interfacially reacting in water and an organic solvent, a dihydric phenol, a carbonate precursor and a molecular weight controlling effective amount of a compound of the formula

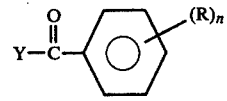

wherein n is an integer having a value of from 0 to 5 inclusive; Y is a halide or hydroxyl; and each R is independently selected from the group consisting of alkyl radicals, aryl radicals, alkaryl radicals, aralkyl radicals, alkoxy radicals, aryloxy radicals, halides,

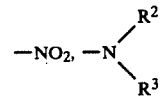

radicals wherein $R^2$ is selected from hydrogen, alkyl radicals or acyl radicals or $R^3$ is an acyl radical or —C≡N. The polymers are useful in injection molded articles.

10 Claims, No Drawings

PREPARATION OF BENZOATE ESTER TERMINATED POLYCARBONATE WITH AROYL HALIDE

This is a continuation of copending application Ser. No. 221,935, filed Dec. 31, 1980 now abandoned.

This invention is directed to aromatic carbonate polymers of controlled molecular weight wherein the polymers contain benzoate or substituted benzoate ester end groups.

BACKGROUND OF THE INVENTION

It is known that in certain procedures of producing aromatic carbonate polymers from dihydric phenols and a carbonate precursor such as phosgene small amounts of certain molecular weight regulators or chain terminators can be used to provide end or terminal groups on the carbonate polymer and thereby control the molecular weight of the polycarbonate. Such materials include phenol and p-tertiary-butylphenol.

The prior art also discloses several other types of compounds that act as chain terminators for the carbonate polymers. Thus, U.S. Pat. No. 3,085,992 discloses alkanol amines as chain terminators; U.S. Pat. No. 3,399,172 teaches imides as chain terminators; U.S. Pat. No. 3,275,601 discloses that aniline and methyl aniline function as chain terminators in the interfacial polymerization process for producing polycarbonates; and U.S. Pat. No. 4,001,184 discloses primary and secondary amines as molecular weight regulators for polycarbonate. Furthermore, U.S. Pat. No. 3,028,365 discloses that aromatic amines and other monofunctional compounds can be used to control or regulate the molecular weight of the polycarbonates, thereby forming aryl carbamate terminal groups. Aromatic polycarbonates having carbamate end groups are disclosed in U.S. Pat. No. 4,111,910. These polycarbonates are prepared using a terminating amount of ammonia, ammonium compounds, primary cycloalkyl, aliphatic or aralkyl amines and secondary cycloalkyl, alkyl or aralkyl amines.

However, according to Schnell, *Chemistry and Physics of Polycarbonates* (1964), page 183, ammonium hydroxide and amines saponify polycarbonates back to the monomers, i.e., bisphenol A. This is supported by Bolgiano in U.S. Pat. No. 3,223,678 wherein he indicates that small amounts of amines such as monoethanolamine and morpholine break or degrade polycarbonates into lower molecular weight polycarbonates. Thus, this area of chemistry is generally not very well understood and is one where the empirical approach is still generally the method used to determine whether a particular compound or class of compounds will function as effective chain terminators or terminal groups in polycarbonate. This area is yet further complicated by the fact that, even though a particular compound may be a chain terminator, its presence as a terminal group in the polycarbonate polymer adversely affects the physical properties of the polycarbonate.

DESCRIPTION OF THE INVENTION

The instant invention is directed to novel high molecular weight aromatic carbonate polymers having as terminal groups particular benzoate esters. The termination of the polymer chain with these groups results in a polymer having controlled molecular weight, high heat distortion temperature and improved heat aged ductility retention.

The aromatic carbonate polymers employed in the practice of this invention are carbonate homopolymers of dihydric phenols, carbonate copolymers of two different dihydric phenols or copolymers of such dihydric phenols with glycols, e.g., ethylene glycol or propylene glycol.

These polycarbonates and their preparation are known in the art and are described, for example, in U.S. Pat. Nos. 3,028,365; 3,334,154; 3,275,601 and 3,915,926, all of which are incorporated herein by reference. Generally, such aromatic carbonate polymers are prepared by reacting a dihydric phenol with a carbonate precursor. The dihydric phenols employed in the practice of this invention are known dihydric phenols in which the reactive groups are the two phenolic hydroxyl groups. Some of these are represented by the general formula

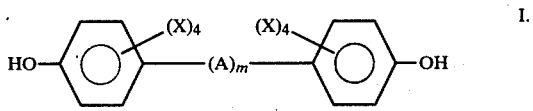

wherein A is a divalent hydrocarbon radical containing from 1 to about 15 carbon atoms; a substituted divalent hydrocarbon radical containing from 1 to about 15 carbon atoms and substituent groups such as halogen;

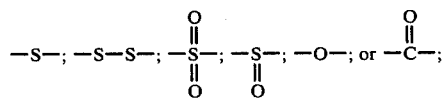

wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an aralkyl group of from 7 to about 14 carbon atoms, an oxyalkyl group of from 1 to about 8 carbon atoms, or an oxyaryl group of from 6 to 18 carbon atoms; and wherein m is zero or 1.

Typical of some of the dihydric phenols that can be employed in the practice of the present invention are bis-phenols such as bis(4-hydroxyphenyl)methane, 2,2-bis(4-hydroxyphenyl)propane (also known as bisphenol A), 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, etc.; dihydric phenol ethers such as bis(4-hydroxyphenyl)ether, bis(3,5-dichloro-4-hydroxyphenyl)ether, etc.; dihydroxydiphenyls such as p,p'-dihydroxydiphenyl, 3,3'-dichloro-4,4'-dihydroxydiphenyl, etc.; dihydroxyaryl sulfones such as bis(4-hydroxyphenyl) sulfone, bis(3,5-dimethyl-4-hydroxyphenyl) sulfone, etc.; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc.; and dihydroxy diphenyl sulfides and sulfoxides such as bis(4-hydroxyphenyl)sulfide and bis(4-hydroxyphenyl)sulfoxide, bis(3,5-dibromo-4-hydroxyphenyl)sulfoxide, etc. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates suitable for use include the bishaloformates of dihydric phenols such as bischloroformates of 2,2-bis(4-hydroxyphenyl)-propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenol and carbonate precursor. The polyfunctional organic compounds useful in making the branched polycarbonates are set forth in U.S. Pat. Nos. 3,635,895 and 4,001,184, which are incorporated herein by reference. These polyfunctional compounds are generally aromatic and contain at least three functional groups which are carboxyl, carboxylic anhydride, haloformyl or mixtures thereof. Some nonlimiting examples of these polyfunctional aromatic compounds inclued trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride or trimellitic acid or their haloformyl derivatives. Also included herein are blends of a linear polycarbonate and a branched polycarbonate.

The instant invention is directed to novel carbonate polymers having as terminal groups or end groups particular benzoate esters. These benzoate ester end groups are formed by the bonding to the oxygen atom of the phenol in the carbonate polymer of a radical represented by the general formula

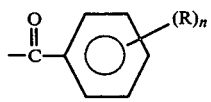

II.

wherein n is a number having a value from 0 up to and including the number of replaceable hydrogen atoms present on the aromatic ring, i.e. 0 to 5 inclusive; and each R, if present, is independently selected from the group consisting of alkyl radicals of from 1 to about 12 carbon atoms, aryl radicals of from 6 to 18 carbon atoms, alkaryl radicals of from 7 to 18 carbon atoms, aralkyl radicals of from 7 to 18 carbon atoms, alkoxy radicals of from 1 to about 12 carbon atoms, aryloxy radicals of from 6 to 18 carbon atoms, halogen, —NO₂ radical

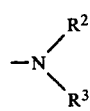

radicals wherein R² is selected from hydrogen, alkyl radicals of from 1 to about 8 carbon atoms and acyl radicals and R³ is an acyl radical, and —C≡N radical.

These radicals of Formula II are obtained from compounds represented by the general formula

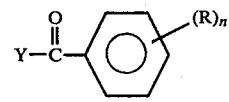

III.

wherein R and n are as defined above and Y represents a halogen, preferably chlorine, or hydroxyl.

The novel carbonate polymers of the instant invention are prepared by reacting at least one compound of Formula III with a dihydric phenol and a carbonate precursor. During the polymerization reaction the compounds of Formula III react with the dihydric phenol to form the benzoate ester end groups present in the polymer and, in the case where Y is halogen, a halogen acid or, in the case where Y is hydroxyl, water.

Some non-limiting illustrative examples of compounds falling within formula III are set forth in Table I.

TABLE I

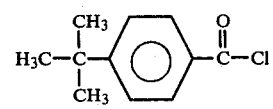

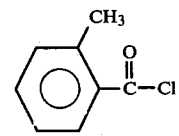

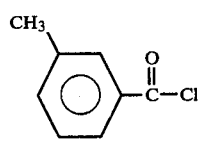

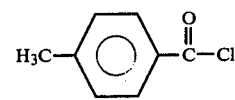

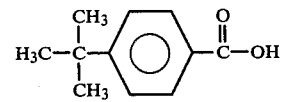

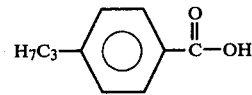

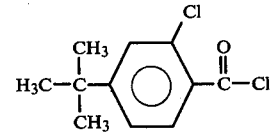

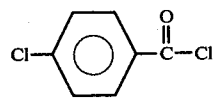

TABLE I-continued

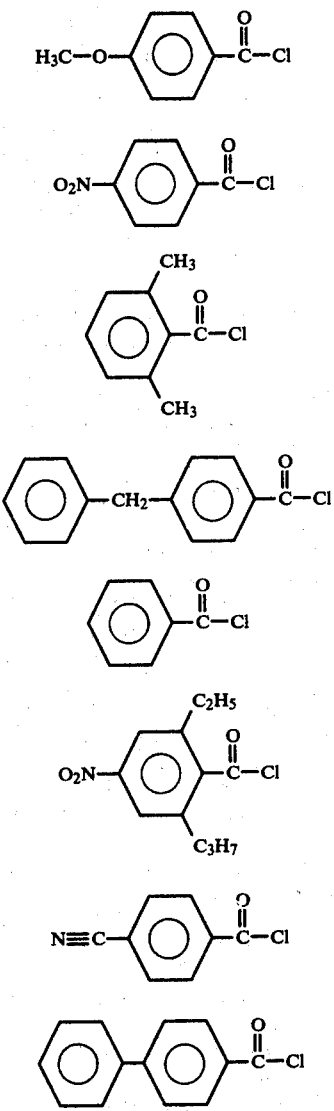

The novel feature of the instant invention is that the compounds of Formula III react with the carbonate polymer to provide a polycarbonate having improved heat distortion and improved heat aged ductility. The weight average molecular weight, for example, can be controlled between about 1,000 and about 200,000 depending upon the amount of the compound of Formula III employed. Generally, the greater the amount of the compound of Formula III employed in the reaction mixture the lower the molecular weight of the carbonate polymer. Conversely, the smaller the amount of the compound of Formula III employed the larger the molecular weight of the polycarbonate. The amount of the compound of Formula III employed is a terminating amount. By terminating amount is meant an amount effective to terminate the chain length of the carbonate polymer before the molecular weight of the polymer becomes too high and, consequently, the polymer becomes too viscous for any practical application but insufficient to terminate the polymer chain before a polycarbonate of useful molecular weight is formed. Generally, this amount ranges from between about 0.1 to about 10 mole percent based on the amount of the dihydric phenol present, preferably from about 1 to 7 mole %.

Only one compound of Formula III may be used, in which case all of the end groups on the polymers will be the same, or two or more different compounds of Formula III may be used, in which instance the polymers will contain a mixture of different terminal groups. Additionally, the compounds of Formula III may be used in conjunction with known phenol and tertiary butyl phenol chain terminators. In such instance the polymers will contain a mixture of end groups formed by the reaction of the various end capping agents with the polymer. The amount of the particular end capping agent used is determinative of the ratio of the resultant end groups present in the polymer.

The method for preparing the aromatic carbonate polymer of this invention, when employing phosgene, involves passing phosgene into a reaction mixture containing a dihydric phenol, an acid acceptor, and at least one compound of Formula III. The compound of Formula III can be present before the introduction of the phosgene or it may be added after introduction of the phosgene has commenced.

A suitable acid acceptor may be either organic or inorganic in nature. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate or an alkali or alkaline earth metal hydroxide. Also present in the reaction mixture may be a catalyst. The catalysts which are employed herein can be any of the suitable catalysts that aid the polymerization of bisphenol A with phosgene. Suitable catalysts include tertiary amines, secondary amines, quaternary ammonium compounds, quaternary phosphonium compounds, amidines, etc.

The temperature at which the phosgenation reaction proceeds may vary from below 0° C. to above 100° C. The reaction proceeds satisfactorily at temperatures from room temperature (25° C.) to 50° C. Since the reaction is exothermic, the rate of phosgene addition may be used to control the reaction temperature. The amount of the phosgene required will generally depend upon the amount of the dihydric phenol present. Generally speaking, one mole of phosgene will react with one mole of the dihydric phenol to provide the polymer and two moles of HCl. Two moles of HCl are in turn "attached" by the acid acceptor present. The foregoing are herein referred to as stoichiometric or theoretical amounts.

The compositions of the present invention may optionally contain other commonly known and used additives such as antioxidants, antistatic agents, mold release agents, colorants, glass fibers, impact modifiers, ultraviolet radiation absorbers, fillers, plasticizers, and flame retardants such as, for example, those described in U.S. Pat. Nos. 3,915,926 and 4,197,232, which are incorporated herein by reference, and color stabilizers.

DESCRIPTION OF THE PREFERRED EMBODIMENT

The following examples are set forth to further illustrate the present invention and are not to be construed as limiting the invention thereto. Unless otherwise specified, where parts or percents are mentioned, they are parts or percents by weight.

EXAMPLE 1

This example illustrates a polycarbonate end capped with a prior art compound and thus falling outside the scope of the present invention.

To a reactor fitted with a mechanical agitator are charged 5.5 liters of deionized water, 7.0 liters of methylene chloride, 2280 grams (10 moles) of bisphenol A, 14 milliliters of triethylamine, 3.4 grams of sodium gluconate, and 34.8 grams (0.37 mole) of phenol. Phosgene is introduced at the rate of 36 grams/minute and phosgenation is continued for 30 minutes. The pH is maintained at between 9.5 and 11.0 by the addition of 25% aqueous sodium hydroxide. After phosgenation has ceased 7 liters of methylene chloride are added, the brine layer is separated by centrifuge and the resin solution is washed with aqueous acid and water. The resin is steam precipitated and dried. To this resin product is added a minor amount (about 0.1 part by weight per hundred parts by weight of resin) of a mixture of a phosphite color stabilizer and an epoxy stabilizer. This resin product is then fed to an extruder operating at a temperature of about 510° F. to extrude the resin into strands and the extruded strands are chopped into pellets. The pellets are then injection molded at about 570° F. into test samples measuring about $2\frac{1}{2}"\times\frac{1}{2}"\times\frac{1}{8}"$.

EXAMPLE 2

This example also illustrates a polycarbonate resin end capped with a prior art chain terminating compound and thus falling outside the scope of the instant invention.

The procedure of Example 1 in preparing a polycarbonate resin is substantially repeated except that (i) the phenol is added to the reaction mixture after phosgenation has proceeded for 15 minutes, and (ii) phosgenation takes place for 42 rather than 30 minutes.

The following examples illustrate the preparation of polycarbonates containing the terminal groups of the present invention.

EXAMPLE 3

To a reactor fitted with a mechanical agitator are charged 5.5 liters of deionized water, 7.0 liters of methylene chloride, 2,280 grams (10 moles) of bisphenol A, 14 milliliters of triethylamine, 3.4 grams of sodium gluconate, and 72.8 grams (0.37 moles) of t-butyl benzoyl chloride. Phosgene is introduced at the rate of 36 grams/minute and phosgenation is continued for thirty minutes. The pH is maintained between 9.5 to 11.0 by the addition of 25% aqueous sodium hydroxide. After phosgenation has been terminated 7 liters of methylene chloride are added, the brine layer is separated by centrifuge and the resin solution is washed with aqueous acid and water. The resin is then steam precipitated and dried. To this resin product is added a minor amount (about 0.1 part by weight per hundred parts by weight of resin) of a mixture of a phosphite color stabilizer and an epoxy stabilizer. This resin product is then fed to an extruder operating at a temperature of about 510° F. to extrude the resin into strands and the extruded strands are chopped into pellets. The pellets are then injection molded at about 570° F. into test samples measuring about $2\frac{1}{2}"\times\frac{1}{2}"\times\frac{1}{8}"$.

EXAMPLE 4

The polycarbonate resin and test samples are prepared substantially in accordance with the procedure of Example 3 except that the t-butyl benzoyl chloride is added after the phosgenation has proceeded for 15 minutes.

EXAMPLE 5

The polycarbonate resin is prepared substantially in accordance with the procedure of Example 3 except that (i) 0.35 mole of benzoyl chloride are substituted for the t-butyl benzoyl chloride, and (ii) phosgenation is carried out for 42 instead of for 30 minutes.

EXAMPLE 6

The polycarbonate resin is prepared substantially in accordance with the procedure of Example 3 except that (i) 0.35 mole of benzoyl chloride is substituted for t-butyl benzoyl chloride, (ii) the benzoyl chloride is added 15 minutes after the addition of phosgene has begun, and (iii) the phosgenation is carried out for 42 rather than 30 minutes.

EXAMPLE 7

The polycarbonate resin is prepared substantially in accordance with the procedure of Example 3 except that (i) 0.35 mole of p-toluoyl chloride is substituted for t-butyl benzoyl chloride, (ii) the p-toluoyl chloride is added 15 minutes after the addition of phosgene has begun, and (iii) the phosgenation is carried out for 42 rather than 30 minutes.

Various physical properties of the samples obtained in Examples 1, 3 and 4 were determined according to the following test procedures;

Heat Distortion Temperature Under Load (DTUL) of the molded samples was determined according to ASTM D-648;

Notched Izod (NI) impact on the molded samples was determined according to ASTM D-256 both before and after heat aging of the molded samples;

The Intrinsic Viscosity was determined in $CH_2Cl_2$ at 25° C.;

Melt Index (MI) was determined according to modified ASTM D-1238.

The polycarbonate resin obtained in Examples 2,5,6 and 7 was subjected to tests to determine the Intrinsic Viscosity, Melt Index, and Polydispersity. The polydispersity of a polymer is obtained by dividing its weight average molecular weight by its number average molecular weight. The lower the polydispersity, the more homogeneous the polymer.

The results of these tests are set forth in Tables II and III.

TABLE II

| Example No. | Melt Index | Intrinsic Viscosity | DTUL (at 264 psi, °F.) | NI (ft. lb./in.) After Heat Aging at 90° C. (Time in Hours) | | |
|---|---|---|---|---|---|---|
| | | | | 0 hrs. | 48 hrs. | 96 hrs. |
| 1 | 8.1 | 0.499 | 274.8 | 16.8 | 5.2 | 2.5 |
| 3 | 8.0 | 0.497 | 279.3 | 16.8 | 15.3 | 15.3 |
| 4 | 8.6 | 0.499 | 279.8 | 16.8 | 15.3 | 15.3 |

TABLE III

| Example No. | Intrinsic Viscosity | Melt Index | Polydispersity |
|---|---|---|---|
| 2 | 0.545 | 6.58 | 2.1 |
| 5 | 0.589 | 4.53 | 1.83 |
| 6 | 0.547 | 5.47 | 1.7 |

TABLE III-continued

| Example No. | Intrinsic Viscosity | Melt Index | Polydispersity |
|---|---|---|---|
| 7 | 0.516 | 8.98 | 1.6 |

As clearly seen in Table II the aromatic polycarbonate polymers having as terminal groups the particular radicals of the present invention, i.e., Examples 3 and 4, have a higher heat distortion temperature and much improved heat aged ductility retention than the prior art aromatic polycarbonates containing end groups derived from phenol. Table III also illustrates that the novel terminal group containing polymers of the instant invention, i.e., Examples 5-7, have controlled weight, as do the prior art polymers as illustrated by Example 2, and additionally are more homogeneous than the prior art polymers.

It will thus be seen that the objects set forth above among those made apparent from the preceding description, are effeciently attained, and since certain changes may be made in carrying out the above process and the compositions set forth without departing from the scope of the invention, it is intended that all matters contained in the above description shall be interpreted as illustrative and not in a limiting sense.

We claim:

1. A process for preparing an aromatic polycarbonate resin of controlled molecular weight which comprises interfacially reacting in water and an organic solvent, a dihydric phenol, a carbonate precursor and a molecular weight controlling effective amount of a compound of the formula

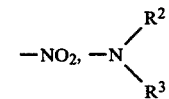

wherein n is an integer having a value of from 0 to 5 inclusive; Y is a halide or hydroxyl; and each R is independently selected from the group consisting of alkyl radicals, aryl radicals, alkaryl radicals, aralkyl radicals, alkoxy radicals, aryloxy radicals, halides, $$-NO_2, -N\begin{matrix}R^2\\R^3\end{matrix}$$

radicals wherein $R^2$ is selected from hydrogen, alkyl radicals or acyl radicals or $R^3$ is an acyl radical or $-C\equiv N$.

2. A process in accordance with claim 1 wherein the amount of said compound is from about 1 to 7 mole percent based on the moles of dihydric phenol present.

3. The process in accordance with claim 2 wherein the organic solvent is a chlorinated hydrocarbon.

4. The process in accordance with claim 3 wherein the carbonate precursor is phosgene.

5. The process in accordance with claim 4 wherein the dihydric phenol is 2,2-bis(4-hydroxyphenyl)propane.

6. The process in accordance with claim 5 wherein the chlorinated hydrocarbon is methylene chloride.

7. The process in accordance with claim 6 wherein Y is chloro.

8. The process in accordance with claim 7 wherein R is independently an alkyl.

9. The process in accordance with claim 8 wherein R is tertiary butyl and n is one.

10. The process in accordance with claim 6 wherein n is one.

* * * * *